United States Patent [19]

Horvat

[11] 4,002,218
[45] Jan. 11, 1977

[54] ELECTRICAL VEHICLE
[76] Inventor: George T. Horvat, 1319 S. 102nd St., West Allis, Wis. 53214
[22] Filed: July 17, 1975
[21] Appl. No.: 596,578

Related U.S. Application Data

[63] Continuation-in-part of Ser. No. 515,354, Oct. 16, 1974, abandoned.

[52] U.S. Cl. .............................. 180/65 DD; 290/44; 416/197 A
[51] Int. Cl.[2] ......................................... B60K 1/00
[58] Field of Search ............ 180/65 R, 65 A, 54 R, 180/54 C, 1 FV, 1 P, 7 P; 290/44, 55; 416/200, 180, 197 A, 187, 198, 244

[56] References Cited
UNITED STATES PATENTS

| | | | |
|---|---|---|---|
| 802,972 | 10/1905 | Carpenter | 416/200 |
| 1,095,967 | 5/1914 | Lister | 180/65 R |
| 1,362,466 | 12/1920 | Beaudin | 180/7 P |
| 1,808,874 | 6/1931 | Wilson | 416/197 A |
| 1,903,307 | 4/1933 | Gillio | 180/65 R |
| 2,941,613 | 6/1960 | DiPerna | 180/65 R |
| 3,374,849 | 3/1968 | Redman | 180/65 R |
| 3,513,326 | 5/1970 | Potts | 180/65 R |
| 3,556,239 | 1/1971 | Spahn | 180/65 A |
| 3,713,503 | 1/1973 | Haan | 180/65 R |
| 3,878,913 | 4/1975 | Lionts et al. | 290/44 |

Primary Examiner—Philip Goodman
Assistant Examiner—David M. Mitchell
Attorney, Agent, or Firm—Andrus, Sceales, Starke & Sawall

[57] ABSTRACT

An electrically operated vehicle provides a series of rotary members specially mounted to be partially exposed to external direct fluid currents and deflected fluid currents from a deflecting member. Each rotary member provides a series of substantially flat radial vanes circumferentially spaced in quadrature with the vanes of one rotating member angularly spaced with respect to the quadrature type vanes provided by an axially spaced rotary member. An axially spaced fluid conducting channel provides a partial vacuum at an axial end of a rotating member for reducing back pressure. An electrical control automatically responds to the differentially sensed electrical charges, within a pair of separate batteries for selectively connecting the battery with the lowest charge to the energy generating source and the battery with the greatest charge to energize an electrical motor driving the vehicle.

8 Claims, 7 Drawing Figures

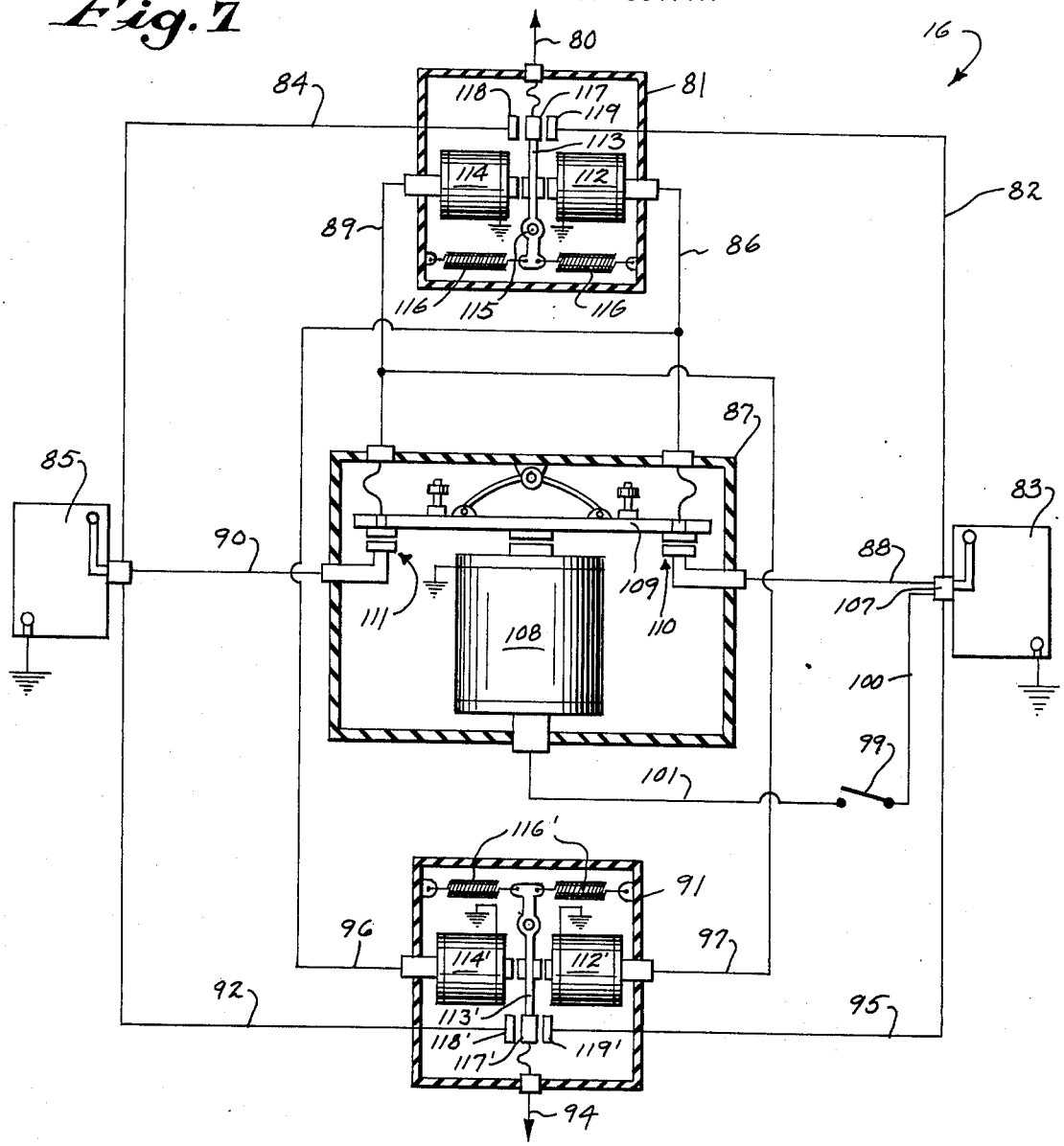
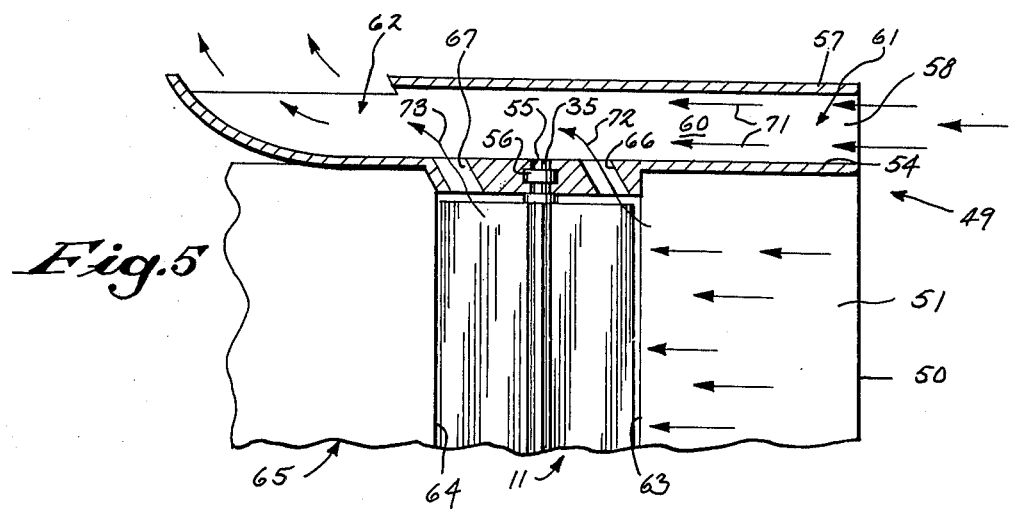

ELECTRICAL VEHICLE

BACKGROUND OF THE INVENTION

This application is a continuation-in-part of application Ser. No. 515,354 filed on Oct. 16, 1974 and now abandoned.

Electrically operated vehicles have been designed for operation in various types of mediums including in the air, on the land, or on or under the water. Such vehicles may vary in size and could be quite small to be used by children or quite large such as a full scale passenger cars, trucks, airplanes, boats or other forms of transportation.

Many electrically operated vehicles employ some form of electrically driven motor for operating a drive train which functions to propel the vehicle in a customary manner such as through the rotation of supporting wheels of a land vehicle or the turning of a screw of an airplane or boat, for example.

Some electrically operated vehicles employ one or more electrical storage elements such as batteries or the like which are coupled either collectively or selectively to energize the electric motor or motive means for propelling the vehicle.

Some electrically operated vehicles have employed one or more electrical generating systems which operate in response to vehicle movement. One known system couples an electrical generator to the vehicle drive train for supplying generated electricity to a storage battery which, in turn, is coupled to energize an electric motor supplying driving energy to the drive shaft.

Some systems have operated electrical generating equipment in response to fluid currents which are experienced as the vehicle moves, such as wind currents opposing movement of a land vehicle, for example. Many of such air current responsive generating systems have employed air conducting tunnels or channels for conducting air current to an internally mounted rotary turbine or the like.

Some electrical vehicles have mounted rotary fans providing curved blades or vanes within air conducting tunnels or channels so that the fan axis is normal to the vehicle movement with several of the curved vanes being exposed directly to external air or fluid flow for operating electrical generating equipment.

Some vehicular systems have employed plural battery sources with fluid or air current responsive generating equipment in which one group of energy storage batteries are connected to be charged by the generating equipment while another group of storage batteries are connected to energize the driving electric motor.

SUMMARY OF THE INVENTION

This invention relates to an electrically operated vehicle utilizing an energy storage means coupled with an energy source for receiving electrical energy and coupled with an electrical motive means for supplying electrical power and propelling the vehicle with a mechanical output.

The energy source includes electrical generating means providing an output connected to supply electrical energy to the storage means. The electrical generating means responds to the operation of a mechanical input which is specially mounted externally adjacent to a body portion of the frame and provides a rotatable member having an axis substantially normal to the direction of vehicle movement. The rotatable member provides a plurality of circumferentially spaced and substantially flat radial vanes. Such rotary vanes are mounted so that at least one of the flat vanes is positioned to receive an external direct fluid current flow external to the body portion in response to vehicle movement or prevailing air currents for generating electrical current.

The body portion of the vehicle is formed to provide an externally facing groove which partially surrounds the rotatable member and permits at least one of the flat vanes to be exposed to the direct fluid current flow external to the vehicle. An inclined panel is provided by the body portion adjacent to the groove and operates to deflect the direct fluid current flow towards the exposed flat vane. In operation, it has been found that the direct and deflected fluid current flows combine in a highly unique manner to provide an extremely desirable operative force against the exposed substantially flat vane and providing a rotative mechanical input for operating the electrical generator supplying electrical energy to the storage means. A majority of the direct and deflected fluid currents are directed against the exposed substantially flat vane or vanes and are thereafter permitted to be externally exhausted away from the vehicle. Such operation is provided without requiring fluid current conducting tubes or tunnels for directing the air currents to a fan or turbine and further eliminates the requirement of tubes or passages for exhausting the major portion of air currents after they have impinged against the rotary members.

In a preferred construction, the groove includes a semi-cylindrical surface which generally is impervious to the fluid air flow and provides a pair of circumferentially spaced edges which are aligned with a substantially common plane with the rotatable member axis. With such construction, approximately one half of the rotatable member is shielded by the frame body portion including the semi-cylindrical surface while exposing approximately one half of the rotatable member to external direct fluid current flow. The air deflecting panel is formed at an incline of approximately 30° with respect to the direct fluid current flow to provide a highly efficient operation caused by the combining of the deflected and direct air current flows.

The mechanical input includes a first rotatable member providing a plurality of vanes including a first series of vanes which are circumferentially spaced substantially in quadrature. A second rotatable member has an axis common to the axis of the first member and provides a plurality of substantially flat radial vanes including a series of second vanes circumferentially spaced substantially in quadrature. With each of the first and second vanes located in radial planes, one preferred mode of construction requires that the first radial planes be angularly spaced from the second radial planes. In the preferred embodiment, one vane of the first rotatable member is located in a plane angularly spaced by approximately forty-five degrees from the planes containing two of the vanes of the axially spaced second rotatable member.

Increased operating efficiency has been found to be provided by a construction which reduces back pressure by creating a pressure drop leading away from an axial end of the rotating member of the mechanical input provided by the energy source means. Such pressure drop is preferably created in response to the fluid current flow provided by the vehicle movement. Specifically, channel is provided through the mounting wall rotatably retaining the axial end of the rotating member thereby reducing fluid back pressure at the rotating member. In a preferred construction, a fluid conducting tunnel is located adjacent to the mounting wall oppositely spaced from the rotating member and communicates with the rotating member through a series of ports or channels passing through the mounting wall. In operation, vehicle movement creates a fluid flow through the tunnel while the series of ports are angularly orientated with respect to the tunnel fluid flow so as to create a fluid flow away from the axial end of the rotating member thereby reducing back pressure against the series of vanes.

In another aspect of the invention, an electrical control is provided for differentially sensing the stored electrical energy within first and second energy storage means. Sensing means responds to the differentially sensed energy and selectively operates between a first condition wherein the first storage means contains a larger magnitude of stored energy than the magnitude of stored energy within the second storage means and a second condition wherein the second storage means contains a larger magnitude of stored energy than the magnitude of stored energy in the first storage means. The first condition electrically connects the first storage means to an input providing energizing power to the motive means and further electrically connects the energy source to the second storage means for receiving charging or energizing power. the second condition of the electrical control connects the second storage means to the input providing energizing power to the motive means and further electrically connects the source to the first storage means for receiving charging or energizing power.

The control means provides a pair of switching circuits which differentially respond to the magnitude of charge located in the pair of energy storage means and further provides the switching control for selectively connecting the energy source and electric motive means to the pair of energy storage means. In a preferred construction, a first switching apparatus provides first and second contacts electrically connected to the first and second storage means while a third pivotal contact is electrically connected to the source means. The pivotal contact is selectively movable for connection with the first contact for operatively connecting the source to the first storage means in the second condition and is further movable for connection with the second contact operatively connecting the source to the second storage means in the first condition. A second switching apparatus includes fourth and fifth contacts electrically connected to the first and second storage means, respectively, and a pivotal six contact electrically connected to the motive means. The sixth pivotal contact is selectively movable for connection with the fourth contact operatively connecting the motive means to the first storage means in the first condition and is movable for connection with the fifth contact operatively connecting the motive means to the second storage means in the second condition.

The first switching apparatus preferably includes first and second solenoid circuits connected to the first and second storage means, respectively, and provides first and second opposing forces upon a first armature providing a differnetial response in positioning the interconnected third contact. In a similar manner, the second switching apparatus includes a third and fourth solenoid circuits connected to the first and second storage means, respectively, and providing third and fourth opposing forces upon a second armature operatively providing a differential response in positioning the interconnected sixth contact.

The differential sensing control provides a unique operating control functioning with a pair of energy storage means for selectively controlling the supply of charging energy to a battery containing the lowest magnitude of charge while simultaneously connecting the battery containing the largest magnitude of charge to energize a driving motor of a vehicle. Such control reduces the amount of manual control required of an operator and maintains uniform and efficient control of plural storage sources.

BRIEF DESCRIPTION OF THE DRAWINGS

The drawings furnished herewith illustrate the preferred construction of the present invention in which the above advantages and features are clearly disclosed as well as others which will be clear from the following description.

In the drawings:

FIG. 5 is a fragmented plan view of a portion of the mechanical input of FIGS. 1 and 4;

FIG. 7 is an electrical schematic view of a portion of the electrical control employed in the vehicle of FIG. 1.

DESCRIPTION OF THE ILLUSTRATED EMBODIMENTS OF THE INVENTION

Figure 1:
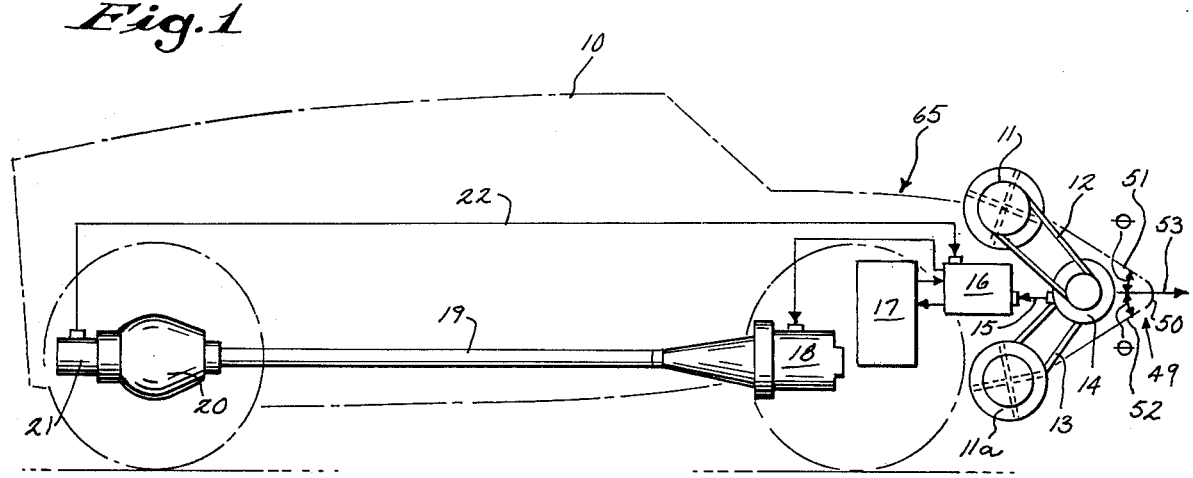
FIG. 1 is a diagrammatic side elevational view of a land vehicle illustrating the electrical generating and control equipment employed for operating the vehicle.

Referring to the drawings and particularly FIG. 1, a land vehicle 10 is diagrammatically illustrated and travels over the surface of a roadway or the like in response to electrical energy. An electrical energy source includes a pair of mechanical rotary inputs including a pair of rotary air current receivers 11 and 11a situated at the forward portion of vehicle 10. The rotary input 11 drives a generator or alternator 14 through a belt 12 while the rotary input 11a is coupled to drive a generator or alternator 14a (not shown) by a belt 13. The generators 14 and 14a are coupled through electrical circuitry illustrated at 15 to an electrical control 16. The electrical control 16, in turn, functions with a pair of energy sources such as batteries illustrated at 17 and also selectively supplies energizing power through appropriate circuitry to operate an electric drive motor 18. The electric motor 18 is the principal motive source for the land vehicle 10 and operates to supply a mechanical output to a drive shaft 19 and a differential 20 for providing rotative movement to a series of wheels supporting and driving the vehicle 10 in a customary manner. An alternator or generator 21 is operatively coupled to the differential 20 and provides an electrical output through a circuit 22 to the electrical control 16 whereby providing an additional generating source of electrical energy for use in operating the electric drive motor 18.

Figure 2:
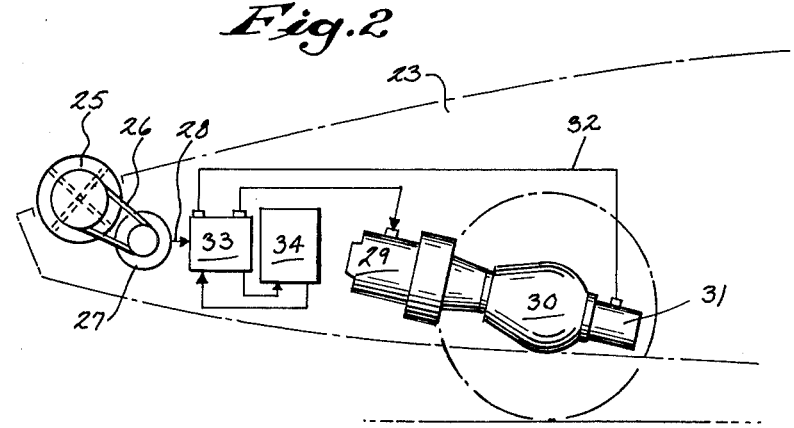
FIG. 2 is a diagrammatic side elevational view of an alternative construction of a land vehicle illustrating the electrical generating and control equipment employed to propel the vehicle.

An alternative construction is illustrated in a vehicle 23 shown in FIG. 2 in which a mechanical rotary input of air current receiver 25 is placed in a rearward location of the vehicle. The mechanical input 25 is coupled through a drive belt 26 to operate a generator or alternator 27. The rotation of the mechanical input 25 in response to vehicle movement such as in a rearward direction operates the generator 27 through belt 26 and supplies energizing current through an electrical circuit 28 operatively supplying energy for use in operating an electric drive motor 29. The drive motor 29 is coupled through a differential 30 for operatively rotating a series of wheels supporting and driving the land vehicle 23. An alternator or generator 31 is operatively coupled to the differential 30 and provides an electrical output through an electrical circuit 32 to an electrical control circuit 33. The electrical control 33 is also connected to receive the energy supplied through the electrical circuit 28 supplied from the energy generating source including the mechanical input 25 and the electrical generator 27. The electrical control 33 cooperates through appropriate circuitry with a plurality of batteries illustrated at 34 and is also electrically coupled to supply energizing power supplied from the batteries to the electric drive motor 29.

Figure 3:
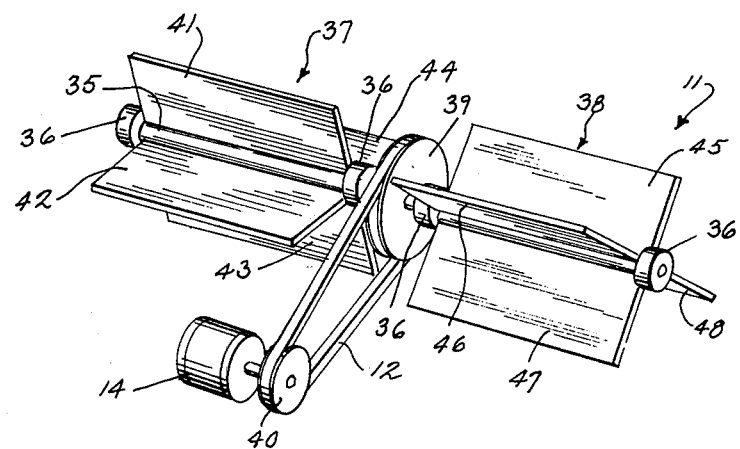
FIG. 3 is a perspective view of a mechanical input employed with the electrical generating equipment of FIGS. 1 and 2.
Figure 4:
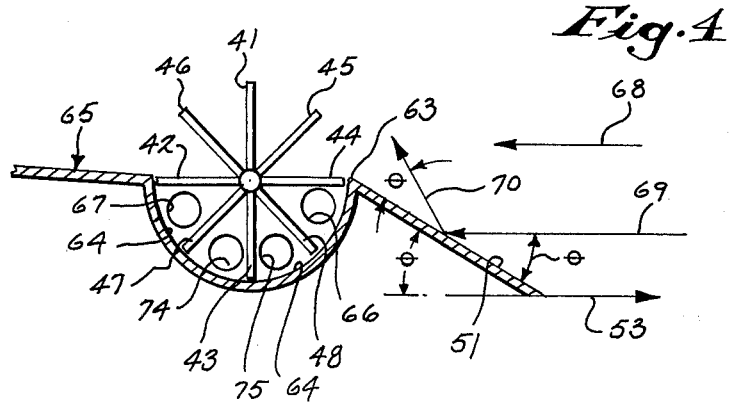
FIG. 4 is an axial view of a portion of the mechanical input of FIG. 3 as employed with the embodiment of FIG. 1.

The mechanical input or rotary air current receiver 11 is illustrated in FIGS. 3–5 and includes a shaft 35 forming a rotary axis and a series of annular couplings 36 for securing a pair of fluid responsive rotary members 37 and 38 to the shaft 35. A pulley 39 is fixedly connected to the shaft 35 for rotation therewith and is coupled through the belt 12 to rotate a pulley 40 coupled to supply a mechanical rotary input to the generator 14. The member 37 includes a series of substantially flat vanes or members 41 through 44 which are fixedly connected to the shaft 35 and extend radially outwardly therefrom and spaced circumferentially from each other in a substantially quadrature relationship. The member 38 is axially spaced from the member 37 and includes a series of substantially flat members or vanes 45 through 48 which are fixedly connected to the shaft 35 and extend radially outward therefrom and spaced in a substantially quadrature relationship. Each of the vanes or elements 41 through 48 are located in corresponding radial planes with each radial plane for the vanes of member 37 angularly spaced from each radial plane for the vanes of member 38. As an example, the plane containing vane 46 of member 38 is angularly spaced by 45° from the planes containing the vanes 41 and 42 of member 37.

The front portion 49 of vehicle 10 includes a forward nose or projection 50 and an upwardly extending air deflecting panel 51 and a downwardly extending air deflecting panel 52. The air deflecting panels 51 and 52 are specially orientated at an angle designated as Θ from a center line or axis 53 therebetween which generally corresponds with the path of vehicle movement.

Each side portion of the vehicle 10 includes a supporting wall 54 providing an opening 55 for rotatively receiving the shaft 35 in connection with appropriate bearings 56 or the like. An enclosing structure includes an outer wall 57 spaced from wall 54 with a bottom wall 58 and a top wall 59 (not shown) connecting wall 57 with wall 54 and forming an air conducting channel 60. The channel 60 thus has an air receiving opening 61 at or near the front portion 49 of vehicle 10 and an exit opening 62 for permitting discharge of the air flowing therethrough.

In that the mechanical input 11 and the associated structure including the air deflecting panel 51 is constructed in a substantially similar manner as the mechanical input 11a and the associated structure including the air deflecting panel 52, only the structure and operation related to the mechanical input 11 and associated structure will be described in detail and it is understood that the mechanical input 11a and associated structure is constructed and operates in a similar manner.

The air deflecting panel 51 extends upwardly at the angle θ which preferably is approximately 30° from the center line 53. The panel 51 thus extends upward from the leading edge or nose 50 at an incline and terminates at an edge 63 adjacent to a groove or depression 64 formed in the hood or top panel portion 65 of vehicle 10. Specifically, the groove 64 is semi-circumferentially shaped having an inner surface spaced from the outer ends of rotating members 37 and 38 for providing rotating clearance therefrom. The semicircumferentially shaped surface of groove 64 is preferably impervious to fluid flow so that the fluid will generally not be permitted beneath the hood portion 65. A pair of channels 66 and 67 are formed in the wall 54 and provide fluid communication between the groove 64 and the channel 60. The channels or openings 66 and 67 are circular in cross-section and each has an axis angularly oriented toward the exit 62 with respect to the normal of the fluid flow channel 60.

In operation, the center line 53 represents the direction of vehicle travel in a forward direction with air currents experienced or produced by such vehicle movement as illustrated at 68 occurring in a direction substantially parallel and opposite to the direction of travel vector 53. The members 37 and 38 are specially positioned so that the air current vector 68 directly engages at least certain of the substantially flat vanes or elements at all times without having to travel through tunnels, channels, or otherwise flow within the body structure.

As illustrated in FIG. 4, the vector 68 impinges upon vane 41 in a substantially perpendicular manner and impinges upon vane 45 at an approximate 45° angle of incidence. An air current vector 69 impinges upon the deflector surface 51 and is deflected upwardly toward the vane 45 as illustrated by the vector 70 at an angle of approximately thirty degrees with respect to surface 51. It has been found that the deflected air current vector 70 coacts with the air current vector 68 and provides a combined air current vector which impinges upon the substantially flat vanes such as 41 and 45 in FIG. 4. Such combination of the direct and deflected air currents before impinging upon the substantially flat vanes has been found to provide increased efficiency in the output supplied by the mechanical input 11.

Additional increased efficiency is provided by the adjacently mounted channel such as at 60 in FIG. 5 which creates an air current vector 71 between inlet 58 and outlet 62. The rapid passage of air across the outlet of ports 66 and 67 creates a pressured drop and draws air currents as illustrated at 72 and 73 from the semi-annular area existing between the outer end portions of rotating members 37 and 38 and the semicylindrical wall 64 and from between adjacent vanes, such as between vanes 42, 43 and 44 of rotating member 37 illustrated in FIG. 4, for example. Additional ports or openings such as at 74 and 75 in FIG. 4 may also be provided in the supporting wall 54 for communication with the channel 60.

It has been found that the withdrawal of air in an axial direction away from the series of vanes provided by the rotating members 37 and 38 has provided a highly efficient operation in reducing back pressure against the vanes.

Figure 6:
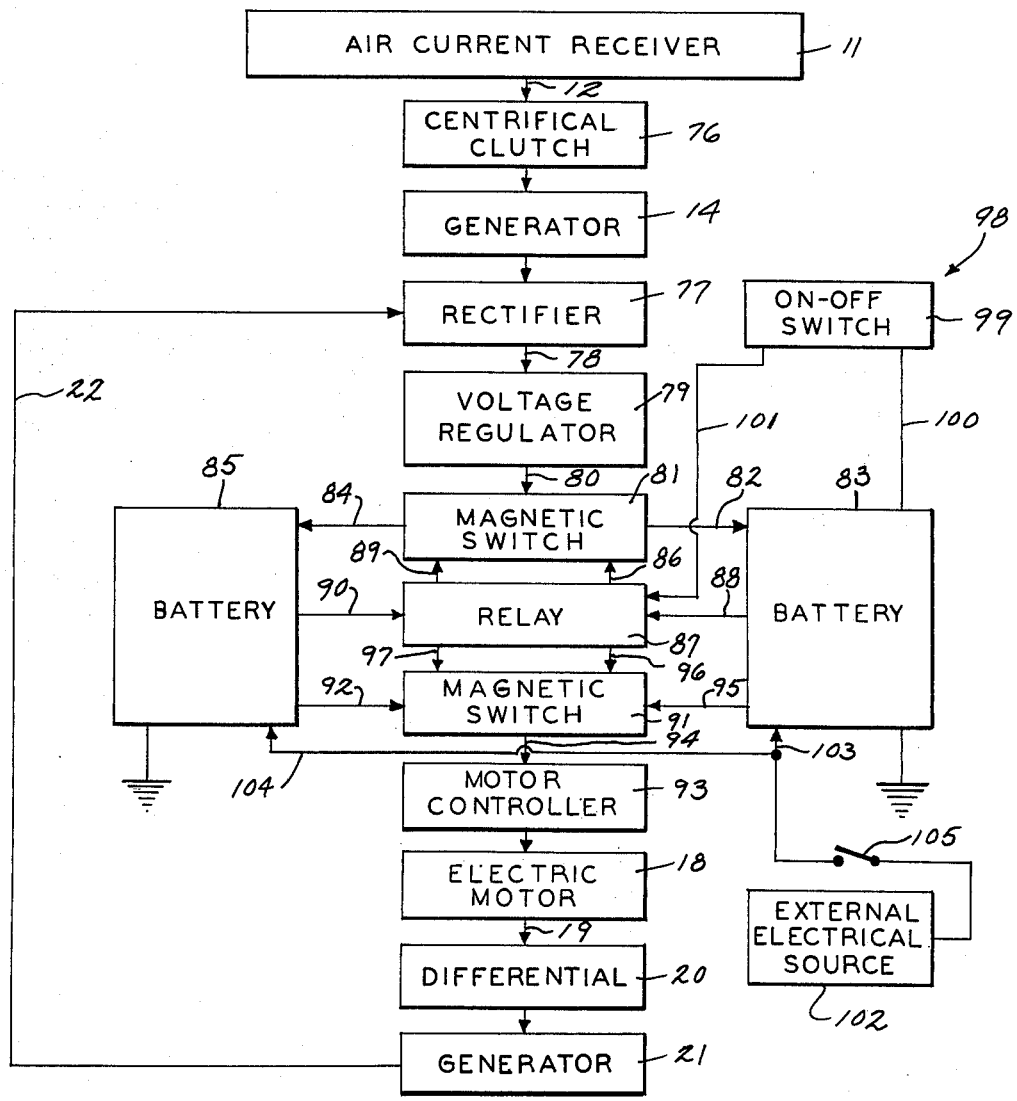
FIG. 6 is a diagrammatical block illustration showing the operating sequence for the vehicle in FIG. 1.

FIG. 6 diagrammatically illustrates the operating sequence employed to operate the vehicle 10. As illustrated therein, the air current receiver or mechanical input 11 operates through the drive belt 12 or other driving mechanism such as gears or the like for providing a mechanical rotary input to the generator or alternator 14 such as through a centrifugal clutch 76. The operation of clutch 76 requires that a predetermined annular speed be obtained by the rotating shaft 35 before supplying a rotative output operating the generator 14. The generator 14 responds to the mechanical rotating input thereto and provides an electrical output such as an alternating current to a full wave rectifying circuit 77. A rectified D.C. output is provided at 78 and supplied to a voltage regulator 79 which, in turn, provides an output at 80 to a magnetic switch 81. When operated to a first condition, the magnetic switch 81 supplies the D.C. input at 80 to an output at 82 for supplying a charging current to a first group of batteries illustrated at 83. When operated to a second condition, the magnetic switch 81 supplies the D.C. input at 80 to an output at 84 for supplying a charging current to a second group of batteries illustrated at 85. The magnetic switch 81 also responds to the magnitude of charge retained by battery 83 through a sensing input 86, a coupling relay 87, and a battery sensing circuit 88 connected to battery 83. The magnetic switch 85 also responds to the magnitude of charge retained by battery 85 through a sensing input 89, the coupling relay 87 and a battery sensing circuit 90 connected to battery 85.

A magnetic switch 91 is connected to a battery output circuit 92 and connects operating power from the battery 85 to a motor controller circuit 93 through an output 94. The magnetic switch 91 is also connected to a battery output circuit 95 and connects energizing power from the battery 83 to the motor controller 93 through the output 94. The magnetic switch 91 senses the magnitude of charge retained by battery 83 through the sensing output 88, relay 87 and a sensing input 96. The magnetic switch also senses the magnitude of charge retained by battery 85 through the sensing output 90, relay 87 and a sensing input 97.

An operating control circuit 98 includes a manually actuated on/off switch 99 which functions to selectively supply energizing power from the battery 83 through an output lead 100 to an input control lead 101 for operatively energizing the relay 87 and initiating automatic operation of the battery charging and motor energizing sequences.

An external electrical source is diagrammatically illustrated at 102 and generally constitutes a fixed source external to vehicle 10. It is contemplated that the batteries 83 and 85 must be periodically recharged by such an external source 102 through the charging circuits 103 and 104, respectively, whenever such circuits are selectively interconnected to the source 102 such as by the closure of the manually operable switch 105.

The electrical energy supplied from either battery 83 or 85 through the magnetic switch 91 and the motor controller 93 is supplied to energize the electric motor 18. The energization of motor 18 operates the differential 20 through the drive shaft 19 thus operating the vehicle 10 as previously described. The generator 21 responds to the operation of differential 20 and generates an electrical current which is supplied through the circuit 22 and providing an electrical input to the rectifier 77. Such generated electricity supplied through the circuit 22 may supplement the electricity generated by the genertor 14.

The construction and operation of the magnetic switches 81 and 91 and relay 87 and their association with the batteries 83 and 85 is more fully shown in FIG. 7. With the closing of switch 99, a positive potential terminal 107 of battery 83 is connected to energize a solenoid 108 of the control relay 87. An armature 109 of relay 87 responds to the energization of coil 108 and closes a first set of contacts 110 for completing a circuit between the battery circuit 88 and the sensing leads 86 and 96. Simultaneously with the closure of contacts 110 a second set of contacts 111 close for completing a circuit between the battery circuit 90 and the sensing leads 89 and 97. The connection of lead 86 to the positive terminal 107 of battery 83 energizes a solenoid 112 of relay 81 having a winding wound in a direction for providing a repelling force to a bi-directional armature element 113 in proportion to the amount of charge retained by the battery 83. In a similar manner, the connection of lead 89 to the positive polarity terminal of the battery 85 energizes a solenoid 114 of relay 81 having a winding wound in a direction for providing a repelling force upon the bi-directional armature 113 proportional to the charge retained by the battery 85.

The solenoid circuits 112 and 114 provided by relay 81 thus provide a differential charge sensing sequence when operating upon the armature 113. When the charge of battery 83 exceeds the charge of battery 85, the repelling force of solenoid 112 exceeds the repelling force of solenoid 114 thereby forcing the armature element 113 towards the solenoid 114. The armture 113 is pivotally mounted at 115 and coupled to a pair of balancing springs 116. An opposite end of armature 113 provides an electrical contact 117 electrically connected to the input circuit 80. With armature 113 repelled towards the solenoid 114, the contact 117 engages a contact 118 thereby supplying charging current from the voltage regulator 79 through the circuit 80, contacts 117 and 118, and the circuit 84 to thereby charge the battery 85. In such a situation, the battery 83 which retains the greater charge would not be charged by the generator 14 because a contact 119 of switch 81 would remain open or spaced from the armature contact 117.

In the case where the charge of battery 85 exceeds the charge of battery 83, the repelling force of solenoid 114 would be greater than the repelling force of solenoid 112. The armature 113 would thus operatively pivot and the contact 117 would engage contact 119 thereby completing a circuit from the voltage regulator 79 through the circuit 80, contacts 117 and 119 and the circuit 82 for charging the battery 83. With battery 83 being charged, the battery 85 will not be charged by the generator 14 because the contacts 117 and 118 will be open or spaced.

The magnetic switch 91 is constructed in a substantially similar manner as the magnetic switch 81 so that substantially similar elements will be identified by identical numbers primed. With the solenoid 108 of relay 87 energized, the solenoid 112' will be proportionately energized in response to the charge retained by the battery 85 while the solenoid 114' will be proportionately energized in response to the charge retained by the battery 83. With battery 83 having a greater magnitude of charge than battery 85, the repelling force provided by solenoid 114' is greater than the repelling force provided by the solenoid 112' so that the contact 117' is rotated by armature 113' to engage the contact 119' thereby permitting battery 83 to supply power through the circuit 95 to the output 94 for energizing the electric motor 18. In such a situation, the contact 118' remains spaced from the movable contact 117' thereby preventing battery 85 from supplying energizing power to the electric motor 18.

The existence of a greater magnitude of charge in battery 85 will operatively transfer the magnetic switch 91 to its second condition so that battery 85 will supply energizing power to the electric motor 18 through the circuit 92, contacts 117' and 118' and the circuit 94.

The differential sensing provided by the magnetic switch units 81 and 91 provide a unique sequence of operation for automatically charging and discharging a plurality of battery sources in response to the sensed differential of charge retained by the various batteries. Such differential sensing eliminates the need for an opertors's constant attention in monitoring the operation of the electrical control while further permitting optimum operation. The differential sensing may provide continual cyclic switching to alternately charge and discharge the batteries 83 and 85. Alternatively, additional circuit elements could be utilized to permit transfer between the two switching conditions only when the source being charged obtains a predetermined voltage, such as by adding appropriate diode circuits in the battery sensing leads 88 and 90. Optionally, switching time delays could be incorporated within the magnetic units 81 and 91 if desired.

The invention provides a highly desirable electrically operated vehicle which has been illustrated for use as a land vehicle. It should be understood, however, that the invention could be employed within a variety of vehicles traveling through various mediums such as air, land or water and that such vehicles could vary in size from a very small vehicle adapted to be used by children to a full scale passenger car, train, airplane, boat, etc. The invention thus provides a highly efficient electrically operated vehicle requiring a minimal amount of manual control by an operator.

Various modes of carrying out the invention are contemplated as being within the scope of the following claims particularly pointing out and distinctly claiming the subject matter which is regarded as the invention.

I claim:

1. A vehicle, comprising means including an outer body portion for supporting motive means having an electrical input and a mechanical output operatively propelling said vehicle, energy storage means connected to said supporting means and operatively connected to said input and providing electrical power to said motive means and propelling said vehicle, and means providing an energy source connected to said supporting means and including electrical generating means providing an electrical output in response to the operation of a mechanical input mounted externally adjacent to said body portion, said mechanical input including a rotatable member having an axis substantially normal to the direction of vehicle movement and providing a plurality of circumferentially spaced and substantially flat radial vanes, said body portion providing an axially extending substantially impervious groove having a pair of axially spaced end walls with one end wall providing a port and partially surrounding said rotatable member and exposing at least one of said vanes having a radial end portion spaced from said body portion and responding to direct fluid current flow external to said body portion in response to vehicle movement and rotating said mechanical input with a substantial portion of the exhausted direct fluid current flow leaving the relatively flat radial vanes in an outward direction external to said outer body portion with fluid trapped in said groove passing through said port and said electrical output being supplied to said storage means.

2. The vehicle of claim 1, wherein said rotatable member axis is substantially normal to an axis of said vehicle substantially corresponding to the direction of vehicle movement, said body portion providing an externally facing groove partially surrounding said rotatable member and exposing at least one of said vanes to a direct fluid current flow having a direction of flow substantially opposite and in response to said vehicle movement and an inclined panel adjacent to said groove and deflecting said direct fluid current flow toward said exposed vane, said direct and deflected fluid current flows combining and providing an operative force against said substantially flat exposed vane and rotating said mechanical input and selectively supplying electrical energy to said storage means.

3. The vehicle of claim 2, wherein said groove includes a semi-cylindrical surface providing a pair of circumferentially spaced edges with said rotatable member axis and said spaced edges located substantially within a common place, said panel forming an inclined surface of approximately thirty degrees with respect to said direct fluid current flow.

4. The vehicle of claim 1, wherein said plurality of vanes includes a series of first vanes circumferentially spaced substantially in quadrature, and said mechanical input including a second member rotatable about an axis common to the axis of said first member and providing a plurality of substantially flat radial vanes including a series of second vanes circumferentially spaced substantially in quadrature, each of said first and second vanes located in radial planes with said first radial planes angularly spaced from said second radial planes.

5. A vehicle, comprising means including an outer body portion and for supporting motive means having an electrical input and a mechanical output operatively propelling said vehicle, energy storage means connected to said supporting means and operatively connected to said input and providing electrical power to said motive means and propelling said vehicle, and means providing an energy source connected to said supporting means and including electrical generating means providing an electrical output in response to the operation of a member rotatably mounted to a pair of axially spaced side walls defining an axially extending groove and retained by said supporting means and having an axis substantially normal to the direction of vehicle movement and responding to a fluid current flow external to said groove in response to vehicle movement and rotating said mechanical input and said electrical output being supplied to said storage means, one of said side walls having a first side adjacent a first pressure immediately adjacent to an axial end of said rotatable member and a second oppositely disposed side adjacent a second pressure less than said first pressure in response to the fluid current flow provided by vehicle movement and said one side wall providing a port connecting said first and second sides and reducing fluid back pressure within said groove at said rotating member.

6. The vehicle of claim 5, wherein said source means includes means connected to said second wall side and forming a fluid conducting tunnel communicating with said port and having an inlet and an outlet and conducting external fluid current flow to provide said second pressure.

7. A vehicle, comprising energy source means providing electrical power, first and second energy storage means selectively connected to said source means and storing said electrical power, motive means having an electrical input operatively connected to said first and second energy storage means and a mechanical output operatively propelling said vehicle in response to the electrical power supplied at said input, and means differentially responding to the sensed stored electrical energy within said first and second storage means and selectively operable between a first condition in response to said first storage means containing a larger magnitude of stored energy than the magnitude of stored energy within said second storage means and a second condition in response to said second storage means containing a larger magnitude of stored energy than the magnitude of stored energy within said first storage means, said responding means including a first switching apparatus having first and second contacts electrically connected to said first and second storage means, respectively, and a pivotal third contact electrically connected to said source means and selectively movable for connection with said first contact operatively connecting said source to said first storage means in said second condition and connection with said second contact operatively connecting said source to said second storage means in said first condition and including first and second solenoid circuits connected to said first and second storage means, respectively, and providing first and second opposing forces upon a first armature operatively providing a differential response in positioning said third contact, and a second switching apparatus having fourth and fifth contacts electrically connected to said first and second storage means, respectively, and a pivotal sixth contact electrically connected to said motive means and selectively movable for connection with said fourth contact operatively connecting said motive means to said first storage means in said first condition and connection with said fifth contact operatively connecting said motive means to said second storage means in said second condition and including third and fourth solenoid circuits connected to said first and second storage means, respectively, and providing third and fourth opposing forces upon a second armature operatively providing a differential response in positioning said sixth contact, said first condition electrically connecting said first storage means to said input means and providing energizing power to said motive means and electrically connecting said source to said second storage means and receiving energizing power, said second condition electrically connecting said second storage means to said input means and providing energizing power to said motive means and electrically connecting said source to said first storage means receiving energizing power.

8. A vehicle, comprising means including an outer body portion and for supporting means providing an energy source including electrical generating means providing an electrical output in response to the operation of a mechanical input adjacent said body portion, said mechanical input including a rotatable member having an axis substantially normal to an axis of said vehicle substantially corresponding to the direction of vehicle movement and providing a plurality of circumferentially spaced and substantially flat radial vanes, said body portion providing an axially extending substantially impervious groove having a pair of axially spaced end walls with one end wall providing a port and partially surrounding said rotatable member and exposing at least one of said vanes to a direct fluid current flow having a direction of flow substantially opposite and in response to said vehicle movement and an inclined panel adjacent to said groove and deflecting said direct fluid current flow toward said exposed vane, said direct and deflected fluid current flows combining and providing an operative force against said exposed vane and rotating said electrical output with a substantial portion of the exhausted combined fluids leaving the relatively flat radial vanes in an outward direction external to said body portion with fluid trapped in said groove passing through said port, first and second energy storage means selectively connected to said source means electrical output and storing said electrical power, motive means having an electrical input selectively connected to said first and second energy storage means and a mechanical output operatively propelling said vehicle in response to the said electrical power supplied at said input, and means differentially responding to the sensed stored electrical energy within said first and second storage means and selectively operable between a first condition in response to said first storage means containing a larger magnitude of stored energy than the magnitude of stored energy within said second storage means and a second condition in response to said second storage means containing a larger magnitude of stored energy than the magnitude of stored energy within said first storage means, said first condition electrically connecting said first storage means to said input means and providing energizing power to said motive means and electrically connecting said source to said second storage means receiving energizing power, said second condition electrically connecting said second storage means to said input means and providing energizing power to said motive means and electrically connecting said source to said first storage means receiving energizing power.

* * * * *

UNITED STATES PATENT AND TRADEMARK OFFICE
CERTIFICATE OF CORRECTION

PATENT NO. : 4,002,218
DATED : January 11, 1977
INVENTOR(S) : GEORGE T. HORVAT

It is certified that error appears in the above-identified patent and that said Letters Patent are hereby corrected as shown below:

| | | |
|---|---|---|
| Column 3, | Line 29, | Before "second" delete "the" and insert ---The--- |
| Column 6, | Line 64, | Delete "pressured" and substitute therefor ---pressure--- |
| Column 9, | Line 31, | Delete "opertors's" and substitute therefor ---operator's--- |
| Column 9, (Claim 1) | Line 60, | Before "for" insert ---and--- |
| Column 10, (Claim 3) | Line 40, | After "common" delete "place" and substitute therefor ---plane--- |

Signed and Sealed this

Thirteenth Day of September 1977

[SEAL]

Attest:

RUTH C. MASON
Attesting Officer

LUTRELLE F. PARKER
Acting Commissioner of Patents and Trademarks